(12) United States Patent
Ng

(10) Patent No.: US 7,048,216 B2
(45) Date of Patent: May 23, 2006

(54) PEPPER GRINDER

(75) Inventor: Hong Wo Ng, Tsuen Wan (HK)

(73) Assignee: Wing Po Plastic Manufactory Limited, Tsuen Wan (HK)

(*) Notice: Subject to any disclaimer, the term of this patent is extended or adjusted under 35 U.S.C. 154(b) by 95 days.

(21) Appl. No.: 10/391,590

(22) Filed: Mar. 20, 2003

(65) Prior Publication Data

US 2004/0124294 A1  Jul. 1, 2004

(30) Foreign Application Priority Data

Dec. 27, 2002  (GB) .................................. 0230230.5

(51) Int. Cl.
   *A47J 42/08*  (2006.01)
   *A47J 42/04*  (2006.01)
(52) U.S. Cl. .................... 241/169.1; 241/168; 241/169
(58) Field of Classification Search ................ 241/168, 241/169, 169.1
   See application file for complete search history.

(56) References Cited

U.S. PATENT DOCUMENTS

| 595,481 | A | | 12/1897 | Jenatschke et al. |
|---|---|---|---|---|
| 1,264,134 | A | | 4/1918 | Quick |
| 2,974,887 | A | | 3/1961 | Grandinetti |
| 3,371,874 | A | * | 3/1968 | Reeves et al. ............ 241/169.1 |
| 3,827,641 | A | | 8/1974 | Andersson |
| 4,530,470 | A | | 7/1985 | Beilstein |
| 4,685,627 | A | | 8/1987 | Lee |
| 5,145,119 | A | | 9/1992 | Lowe |
| 5,176,329 | A | | 1/1993 | De Coster et al. |
| 5,531,389 | A | | 7/1996 | Husted |
| 5,785,264 | A | | 7/1998 | Yang |
| 5,897,067 | A | * | 4/1999 | Tardif et al. ............. 241/169.1 |
| 6,443,377 | B1 | * | 9/2002 | Cheng ...................... 241/169.1 |
| 6,793,168 | B1 | * | 9/2004 | Pedersen .................. 241/169.1 |
| 2004/0069881 | A1 | * | 4/2004 | Arduini .................... 241/169.1 |

FOREIGN PATENT DOCUMENTS

| GB | 794560 | 5/1958 |
|---|---|---|
| GB | 1 467 588 | 3/1977 |
| GB | 2 263 074 | 7/1993 |
| GB | 2 364 937 | 2/2002 |
| GB | 2 379 622 | 3/2003 |

OTHER PUBLICATIONS

U.S. Appl. No. 10/391,591, filed Mar. 20, 2003, Ng.

* cited by examiner

Primary Examiner—Derris H. Banks
Assistant Examiner—Jason Y. Pahng
(74) Attorney, Agent, or Firm—Leydig, Voit & Mayer, Ltd.

(57) ABSTRACT

A pepper grinder comprising a pepper seed bottle having upper and lower openings, through which upper opening the bottle may be refilled. A pepper grinding mechanism is provided in the lower bottle opening, through which ground pepper may be dispensed. The mechanism comprises a female grinding member and a male grinding member supported co-axially therein for relative rotation to grind pepper, the two members being spaced apart by an annual gap in which pepper is to be ground. The mechanism includes a positioning ring in engagement with the male grinding member, which may be turned to adjust the axial position of the male grinding member relative to the female grinding member and hence the width of the gap and in turn the pepper grinding size. The positioning ring comprises a ring body and two spokes that extend across opposite sides of the ring body for engagement by a user to turn the ring.

15 Claims, 9 Drawing Sheets

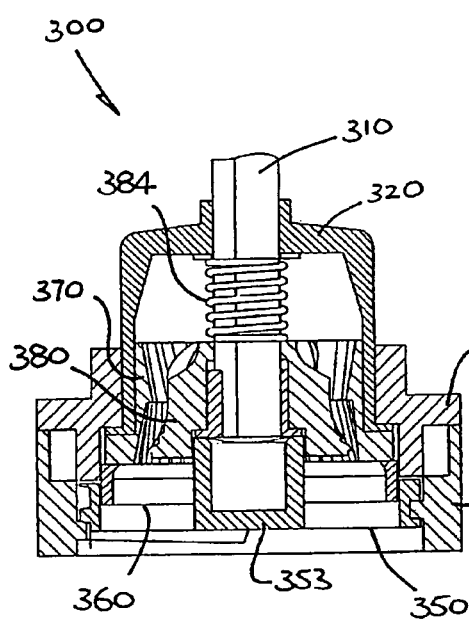
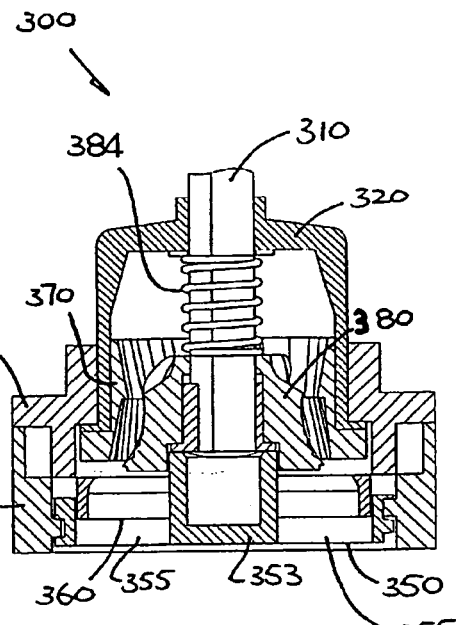
FIG. 9A
FIG. 10A
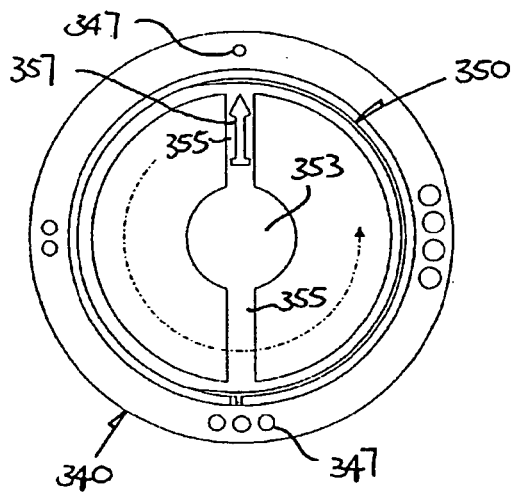
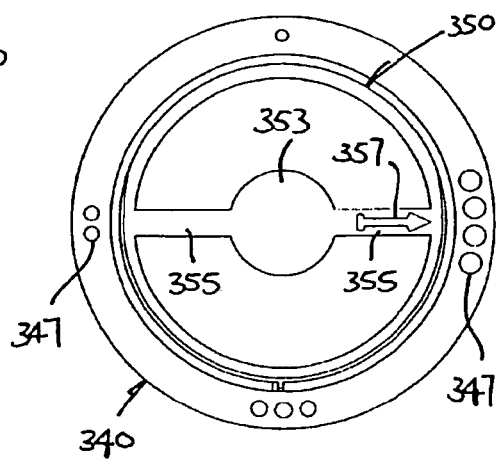
FIG. 9
FIG. 10

PEPPER GRINDER

The present invention relates to a pepper grinder.

BACKGROUND OF THE INVENTION

The grinding mechanism of most pepper grinders is adjustable so as to provide different grinding sizes. In a known construction of the rotary grinding type, the adjustment is enabled by a disc that can be turned like a dial by its rim, which is however inconvenient to use.

The subject invention seeks to provide an improved pepper grinder incorporating a grinding mechanism whose grinding size can more easily be adjusted.

SUMMARY OF THE INVENTION

According to the invention, there is provided a pepper grinder comprising a bottle for containing pepper seeds, the bottle having first and second openings, through which first opening the bottle may be refilled with pepper seeds. A pepper grinding mechanism is provided in the second opening of the bottle, through which pepper ground by the grinding mechanism may be dispensed. The grinding mechanism comprises a female grinding member and a male grinding member supported co-axially in the female grinding member for rotation relative thereto for grinding pepper, the two members being spaced apart by an annual gap in which pepper is to be ground. The grinding mechanism includes a positioning ring in engagement with the male grinding member and supported for turning to adjust the axial position of the male grinding member relative to the female grinding member and hence the width of the gap and in turn the pepper grinding size. The positioning ring comprises a ring body and a cross member that extends across opposite sides of the ring body for engagement by a user to turn the positioning ring.

Preferably, the cross member extends substantially radially across opposite sides of the ring body.

More preferably, the cross member extends substantially diametrically across opposite sides of the ring body.

It is preferred that the positioning ring includes a protruding central boss in co-axial engagement with the male grinding member, the boss being connected by the cross member to the ring body.

Preferably, the cross member comprises a plurality of equiangularly spaced spokes.

More preferably, the cross member comprises two diametrically extending spokes.

In a specific construction, the grinding mechanism includes a central operating shaft having an end extending through and in engagement with the male grinding member for rotating it, and the boss includes a central hole accommodating the shaft end.

It is preferred that the grinding mechanism includes a spring resiliently biassing the male grinding member against the positioning ring.

It is further preferred that the grinding mechanism includes a central operating shaft having an end extending through and in engagement with the male grinding member for rotating it, and the spring is disposed on the shaft end.

In a preferred embodiment, the grinding mechanism includes a base ring supporting the positioning ring co-axially for turning through screw-thread engagement.

More preferably, the positioning ring and the base ring have co-operable screw threads for engagement and include inter-engageable parts to define a plurality of predetermined angular positions for the positioning ring relative to the base ring.

Further more preferably, the inter-engageable parts are provided at the screw threads of the positioning ring and the base ring respectively.

Yet further more preferably, the inter-engageable parts comprise a protrusion and recesses corresponding to the predetermined positions.

Advantageously, the base ring includes indicia to indicate the predetermined positions of the positioning ring.

In a preferred arrangement, the positioning ring has four equiangular predetermined positions relative to the base ring.

Conveniently, the positioning ring is arranged to be turned through an angle smaller than 360°.

BRIEF DESCRIPTION OF DRAWINGS

The invention will now be more particularly described, by way of example only, with reference to the accompanying drawings, in which:

FIGS. 9 and 9A are bottom plan and cross-sectional side views of the grinding mechanism of FIG. 3, in one operating condition providing a fine pepper grinding size; and FIGS. 10 and 10A are bottom plan and cross-sectional side views corresponding to FIGS. 9 and 9A, in another operating condition providing a coarse pepper grinding size.

DETAILED DESCRIPTION OF PREFERRED EMBODIMENT

Figure 1:
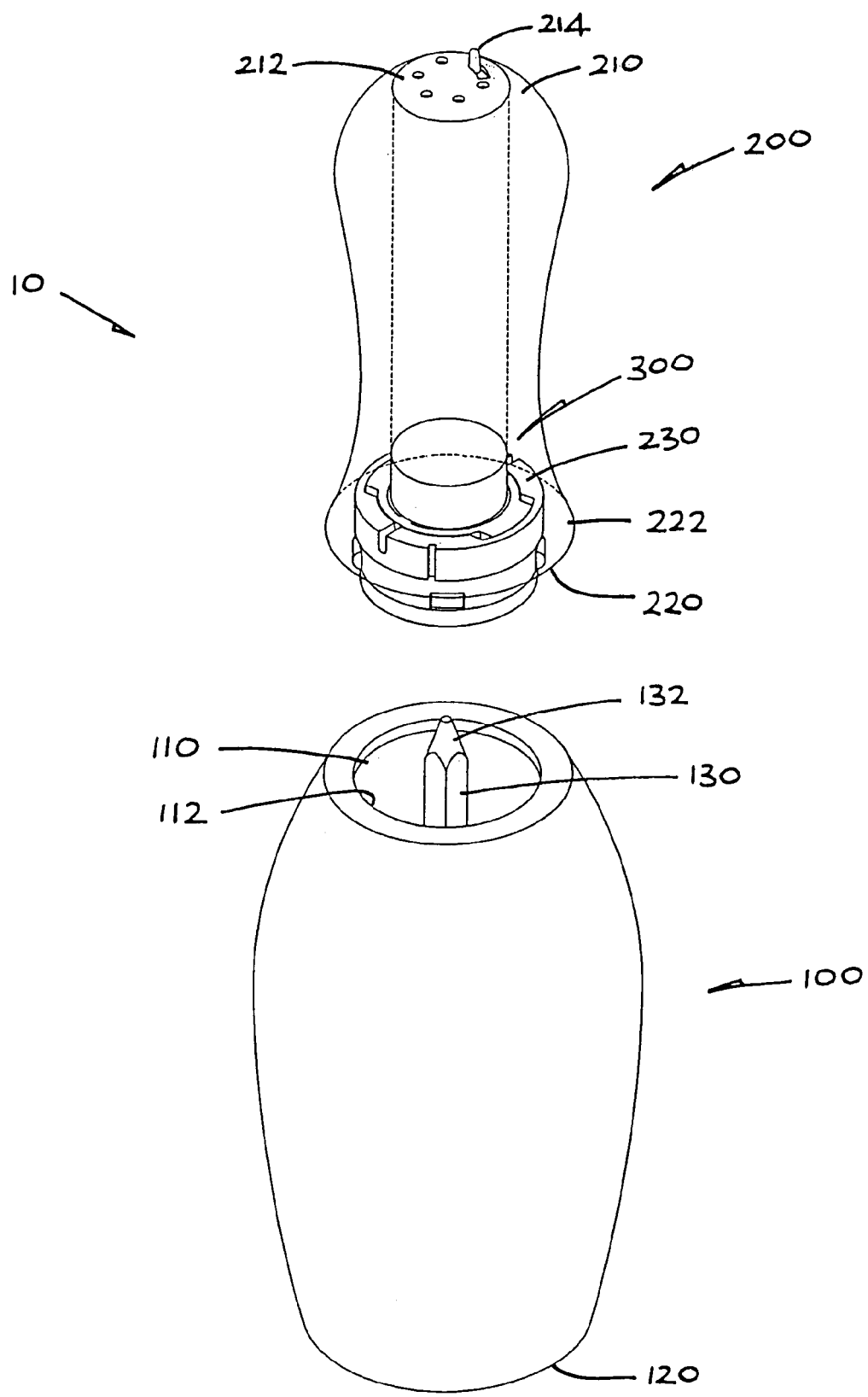
FIG. 1 is a perspective view of an embodiment of a pepper grinder in accordance with the invention, said grinder having a pepper bottle and an upper handle for operating a pepper grinding mechanism provided in the bottom of the bottle.
Figure 2:
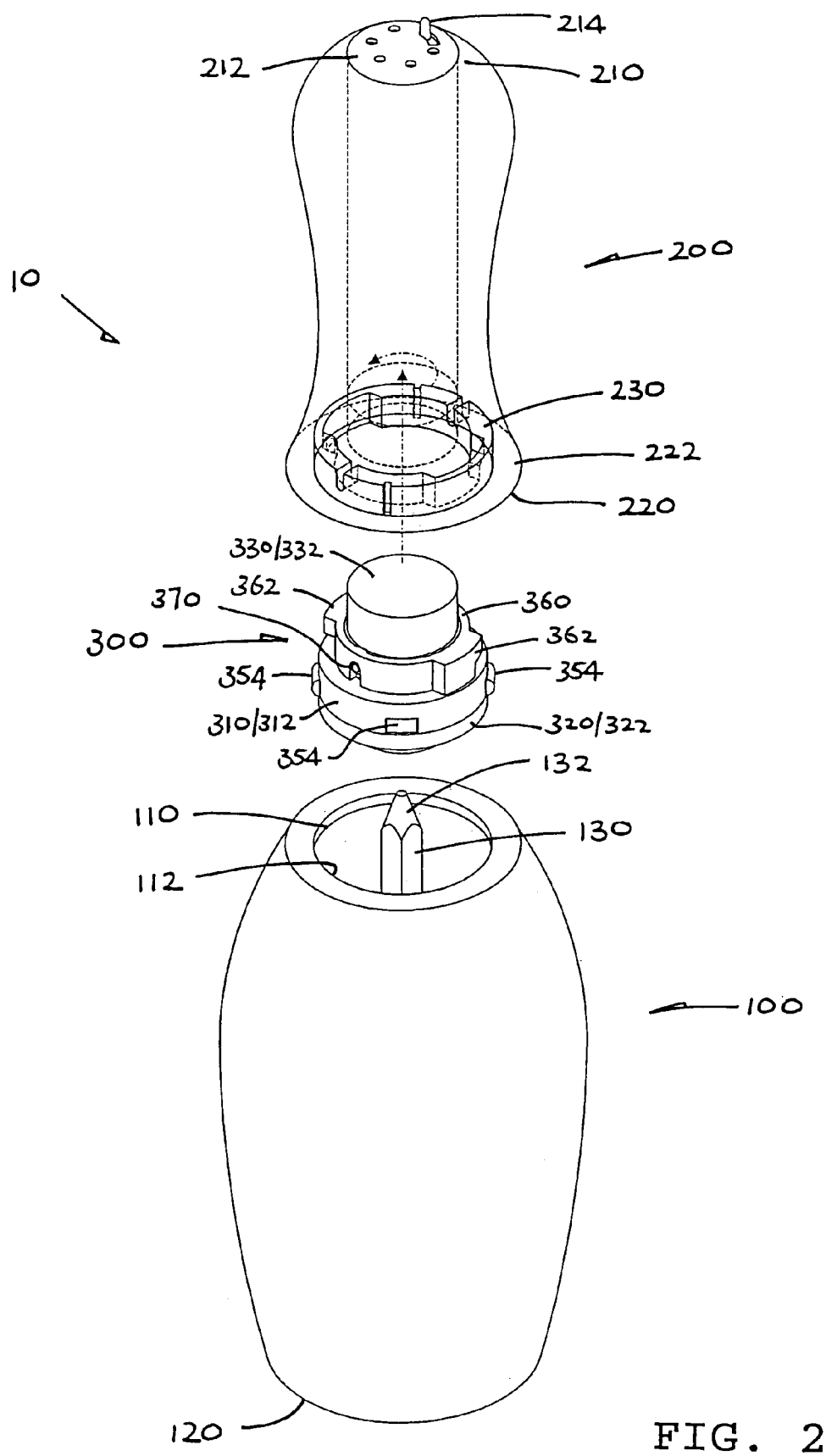
FIG. 2 is a perspective view of the bottle of FIG. 1, showing the grinding mechanism.
Figure 3:
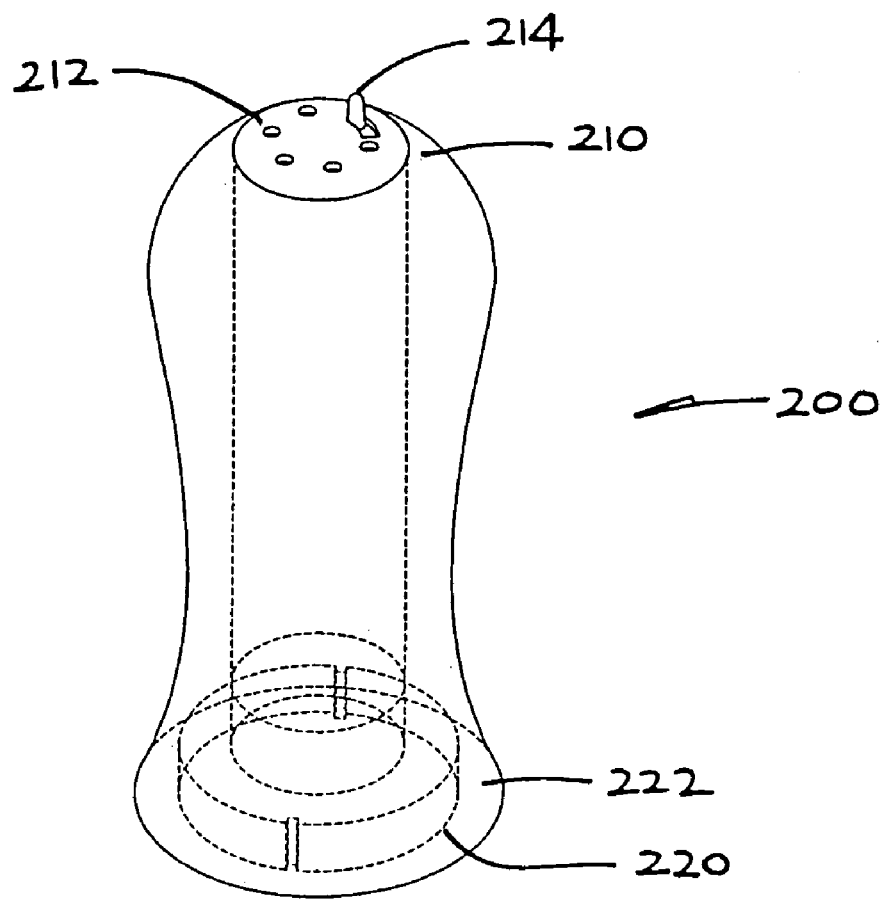
FIG. 3 is a cross-sectional side view of the bottle and grinding mechanism of FIG. 2.
Figure 3:
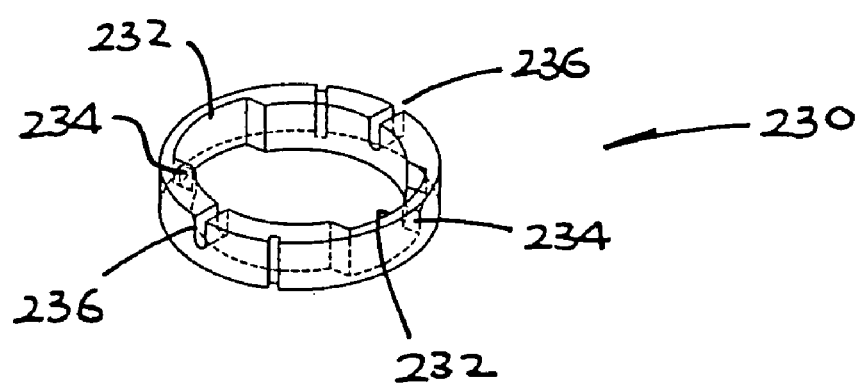
Figure 4:
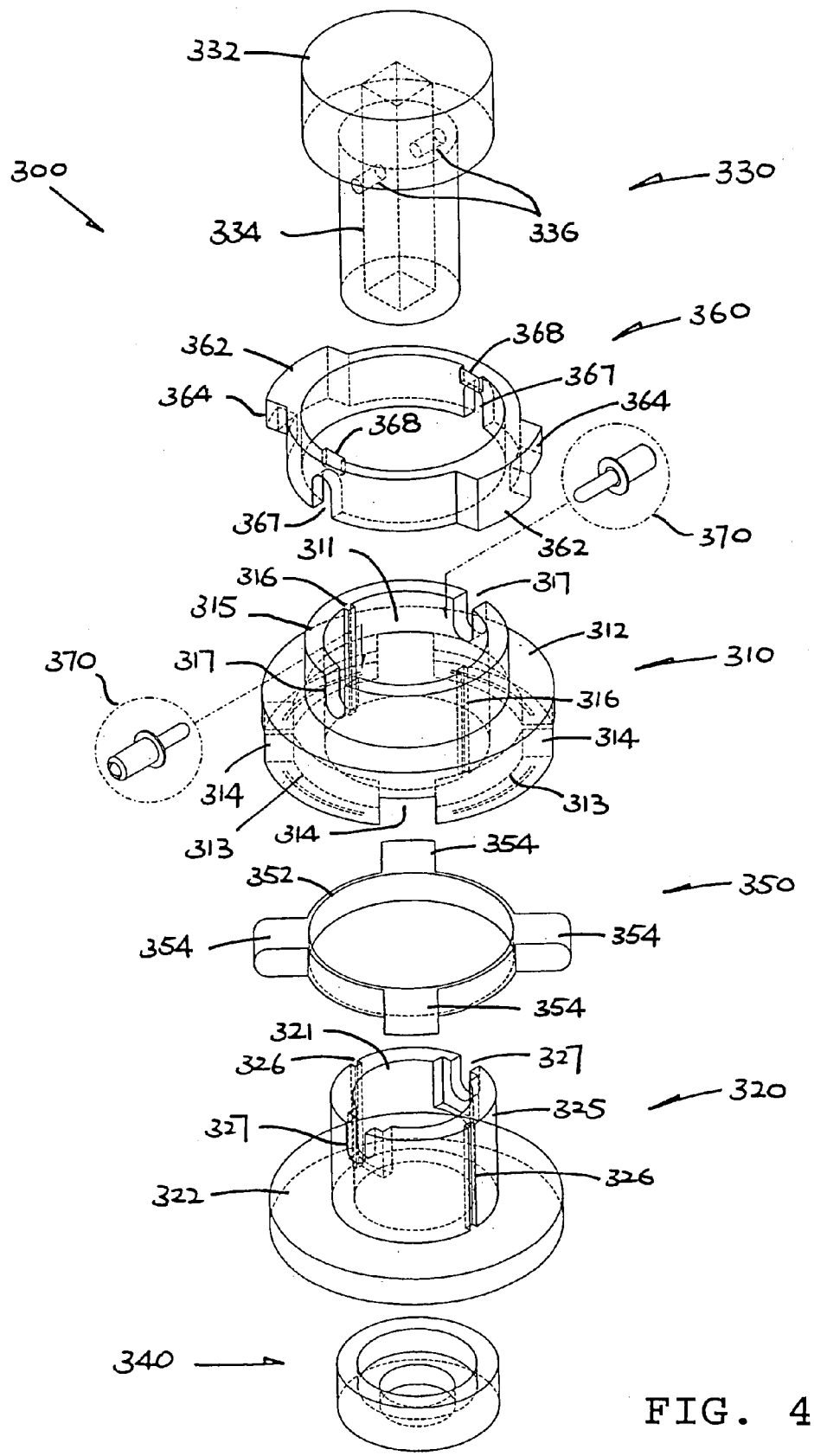
FIG. 4 is a partially exposed perspective view of the grinding mechanism of FIG. 3.

Referring to the drawings, there is shown a pepper grinder 10 embodying the invention, which comprises a plastic upright bottle (body) 100 for containing pepper seeds, a plastic upright handle 200 (or any turning knob) connectable co-axially atop the bottle 100, and a grinding mechanism 300 in the bottle 100. The handle 200 may be made to contain and dispense salt, and includes a plastic coupler 210 at its lowermost end for releasable connection with the bottle 100. The bottle 100 and handle 200 when connected together resemble a bowling pin, between which the coupler 210 is concealed.

The bottle 100 has opposite circular open top and bottom ends 110 and 120. The top end 110 acts as a mouth 110, through which the bottle 100 may be refilled with pepper seeds. The mouth 110 has a peripheral wall 112 that converges upwards. The coupler 210 acts like a plug insertable into the bottle mouth 110, which includes four protruding knobs 212 equiangularly around its periphery.

The knobs 212 are resiliently biassed outwards and act as latches for, upon insertion, engaging behind the bottle mouth wall 112 through a snap action, thereby connecting the handle 200 to the bottle 100. As the knobs 212 are round on both upper and lower sides, the handle 200 can be plugged to and unplugged from the bottle 100 at will. Given that the mouth 110 is circular, the handle 200 can rotate freely relative to the bottle 100 about their common vertical axis.

The grinding mechanism 300 is installed inside the bottom end 120 of the bottle 100, through which pepper ground by the mechanism 300 may be dispensed. The grinding mechanism 300 has a metal central operating shaft 310 that extends upwards through the bottle 100 with its top end 311 protruding slightly out of the mouth 110. The shaft 310 has a square cross-section, whose top end 311 is engaged by a matching square central hole of the coupler 210, such that the shaft 310 can be turned by the handle 200 to operate the grinding mechanism 300.

The grinding mechanism 300 includes an inverted U-shaped plastic bracket 320 supporting the shaft 310, a stationary plastic top ring 330 locating the bracket 320, and a stationary plastic base ring 340 fixed with the top ring 330, all being co-axially inter-engaged. A plastic positioning ring 350 is co-axially engaged within the base ring 340 through respective screw threads, and a plastic spacer ring 360 is placed co-axially on the positioning ring 350. The top ring 330 also co-axially locates a porcelain female grinding member 370, co-axially within which a porcelain male grinding member 380 is positioned.

Figure 5A:
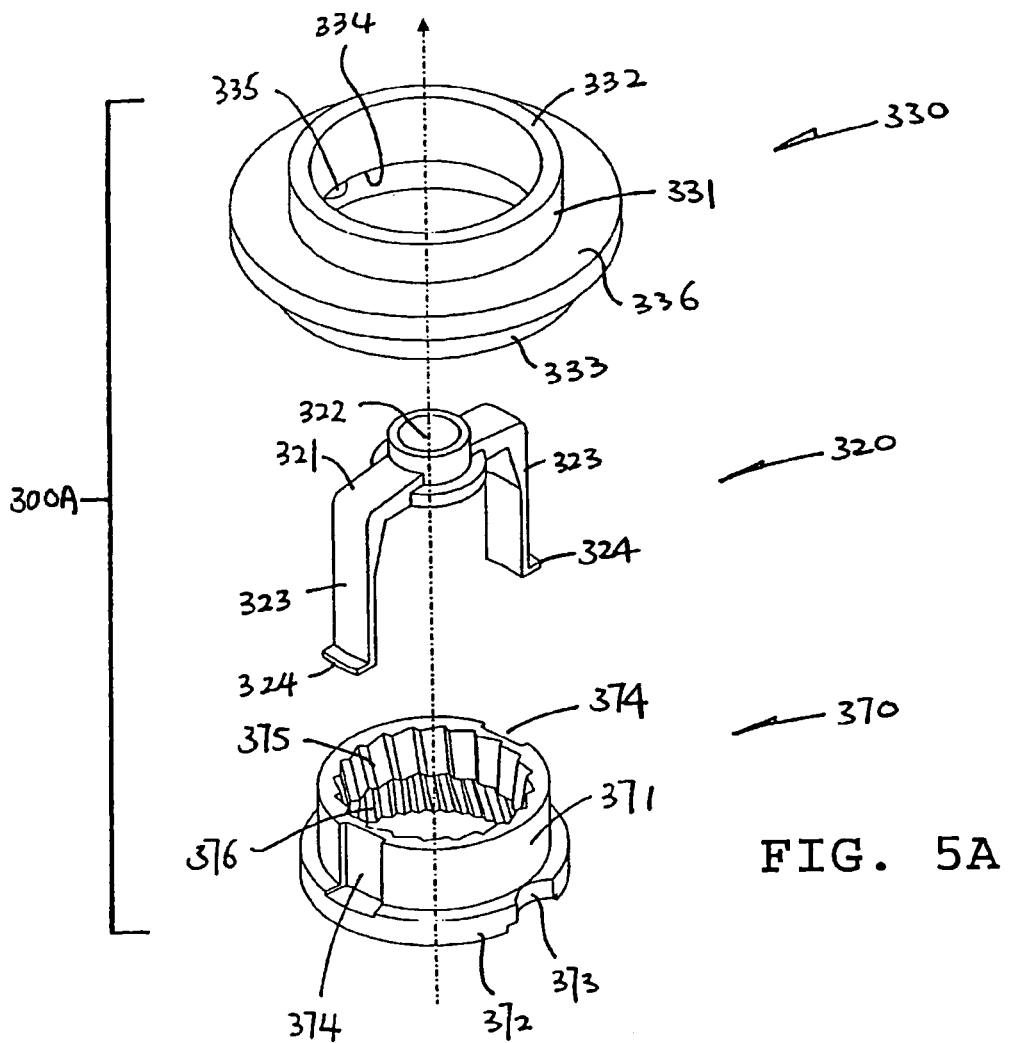
FIGS. 5 and 5A are assembled and exposed perspective views of an upper unit of the grinding mechanism of FIG. 4, including a female grinding member.
Figure 5:
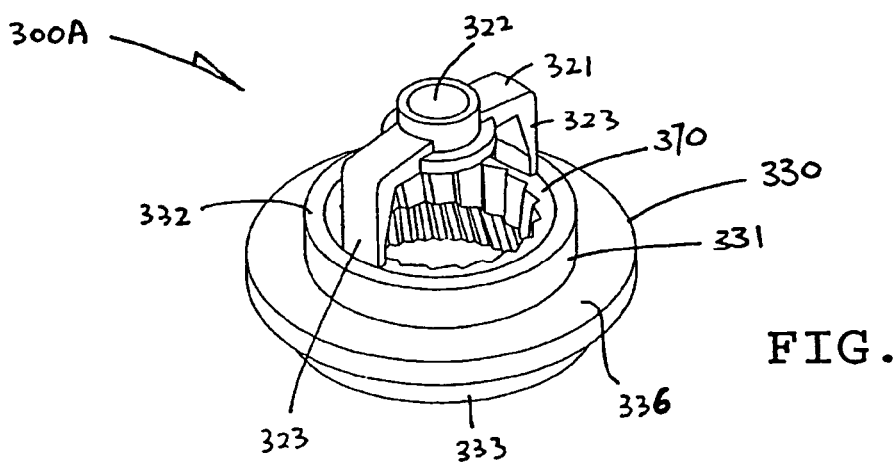

The top ring 330, bracket 320 and female grinding member 370 constitute an upper unit 300A (FIGS. 5 and 5A). The top ring 330 has a collar 331 and an annual peripheral flange 336 around the waist of the collar 331. The collar 331 has an upper part 332 and a slightly enlarged lower part 333 forming an internal annual corner 334 with the upper part 332, in which a pair of diametrically opposite knobs 335 are formed. The bracket 320 has a bridge 321 including a circular central hole 322 and a pair of legs 323 depending from opposite ends of the bridge 321. Each leg 323 has a foot 324.

Figure 6A:
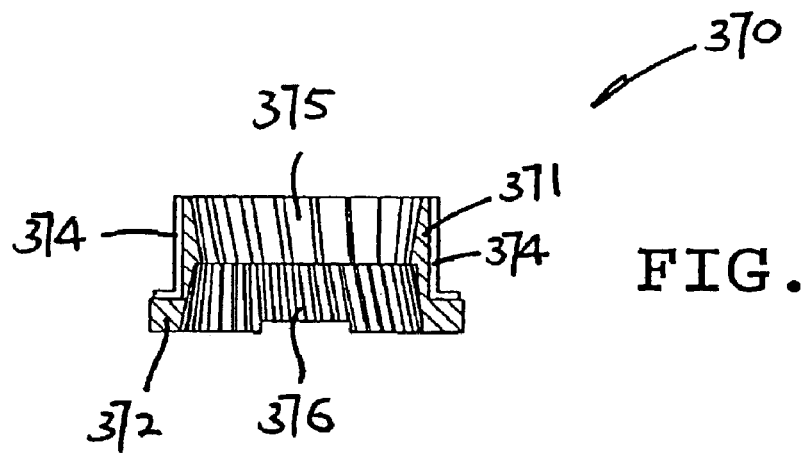
FIGS. 6 and 6A are perspective and cross-sectional side views of the female grinding member of FIG. 5A.
Figure 6:
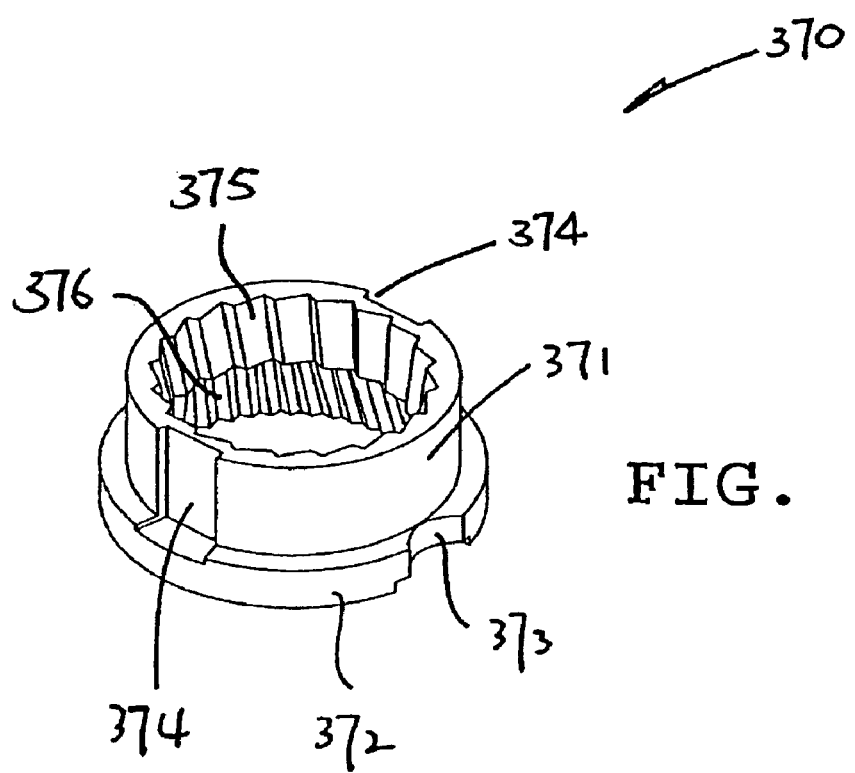

The female grinding member 370 (FIGS. 6 and 6A) has a generally cylindrical body 371 and an annual peripheral flange 372 around the bottom of the body 371. The flange 372 has a pair of diametrically opposite cutouts 373. An L-shaped recess 374 is formed on the adjoining outer and upper surfaces of the body 371 and flange 372 respectively, on each of diametrically opposite sides thereof. The inner surface of the body 371 has frusto-conically shaped upper and lower parts converging towards each other, on which respective slightly skewed teeth 375 and 376 are formed. The upper teeth 375 are relatively coarse for drawing in and crushing pepper seeds, whereas the lower teeth 376 are relatively fine for subsequently grinding the crushed seeds.

For assembly, the bracket 320 is located with its feet 324 in respective recesses 374 of the female grinding member 370, both of which are then inserted from below into/through the top ring 330. The grinding member 370 is jammed as a push-fit wholly into the collar 331 of the top ring 330, thereby clamping the bracket 320 by its legs 323, with the cutouts 373 engaging the knobs 335 to prevent relative rotation.

Figure 7A:
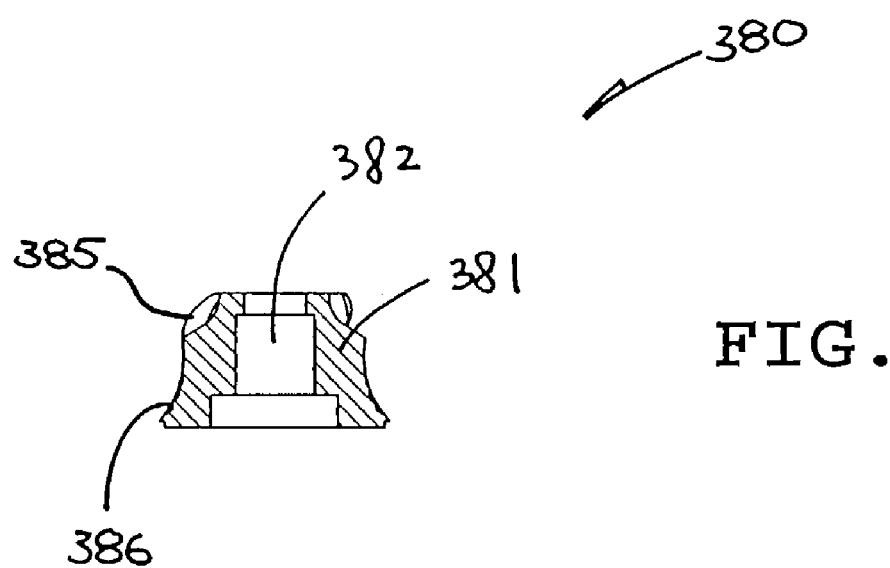
FIGS. 7 and 7A are perspective and cross-sectional side views of a male grinding member of FIG. 4.
Figure 7:
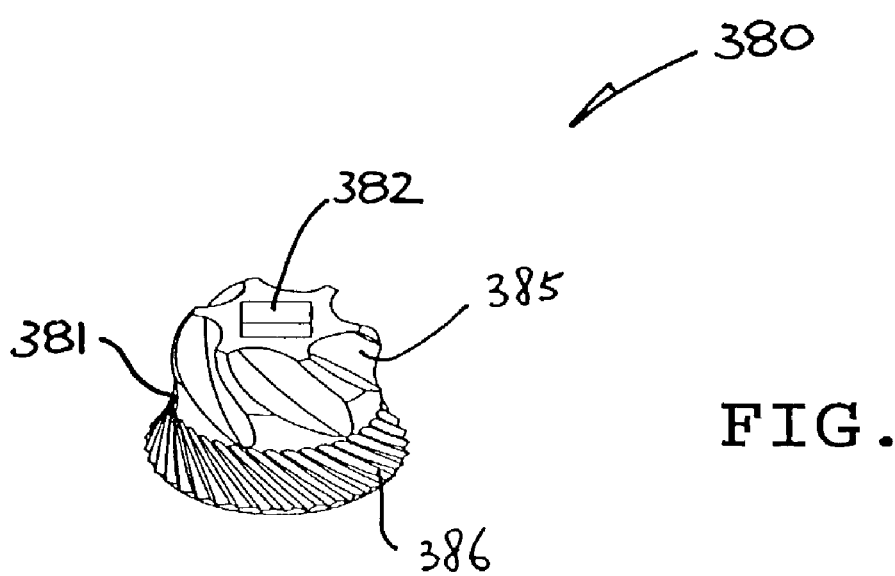

The male grinding member 380 (FIGS. 7 and 7A) has a generally bell-shaped body 381, whose outer surface has upper and lower parts, on which respective skewed teeth 385 and 386 are formed. The upper teeth 385 are rather coarse for drawing in and crushing pepper seeds, whereas the lower teeth 386 are much finer for subsequently grinding the crushed seeds. The body 381 includes a square central hole 382 having an enlarged lower end.

The shaft 310 and male grinding member 380 constitute a middle unit 300B, in that the shaft 310 passes from below through the central hole 382 of the grinding member 380. The grinding member 380 is retained on a flanged bottom end 312 of the shaft 310, through a plastic bush 383. By reason of the engagement between its square hole 382 and the square cross-section of the shaft 310, the male grinding member 380 is rotatable by the shaft 310. A compression coil spring 384 is disposed on the shaft 310, which rests on the grinding member 380 and is followed by a washer 387.

In order to assemble the two units 300A and 300B together, the shaft 310 is inserted upwardly through the top ring 330, the female grinding member 370 and the bridge 321 of the bracket 320 until the male grinding member 380 enters fully into the female grinding member 370, all in a co-axial manner. The shaft 310 is then retained by C-clip 388 fitted at a position immediately above the bracket 320. The spring 384 co-acts between the bridge 321 above and the male grinding member 380 below, thereby resiliently biassing the male grinding member 380 outwardly of the female grinding member 370.

The male grinding member 380 remains generally within the female grinding member 370, together forming an annual, or more specifically double frusto-conical, gap for crushing and grinding pepper seeds.

Figure 8A:
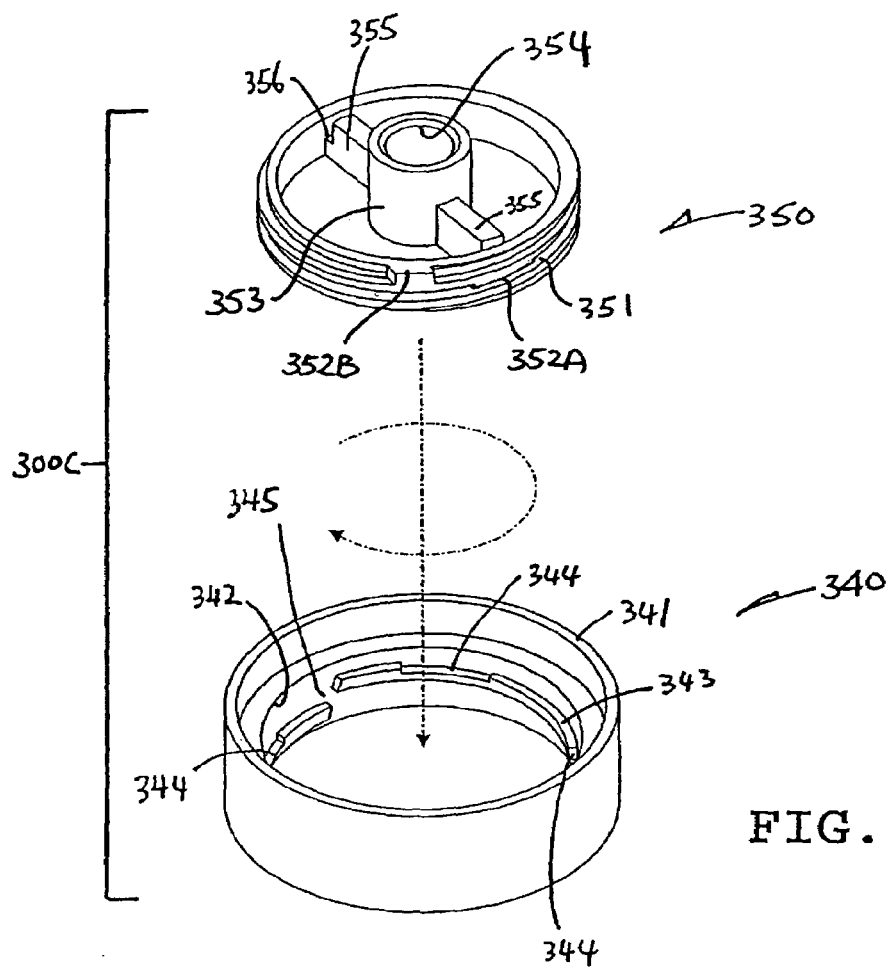
FIGS. 8 and 8A are assembled and exposed perspective views of a lower unit of the grinding mechanism of FIG. 4.
Figure 8:
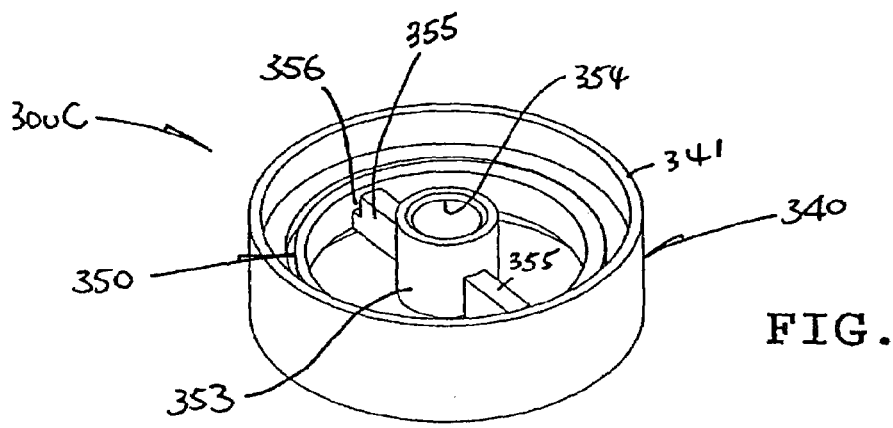
Figure 1:
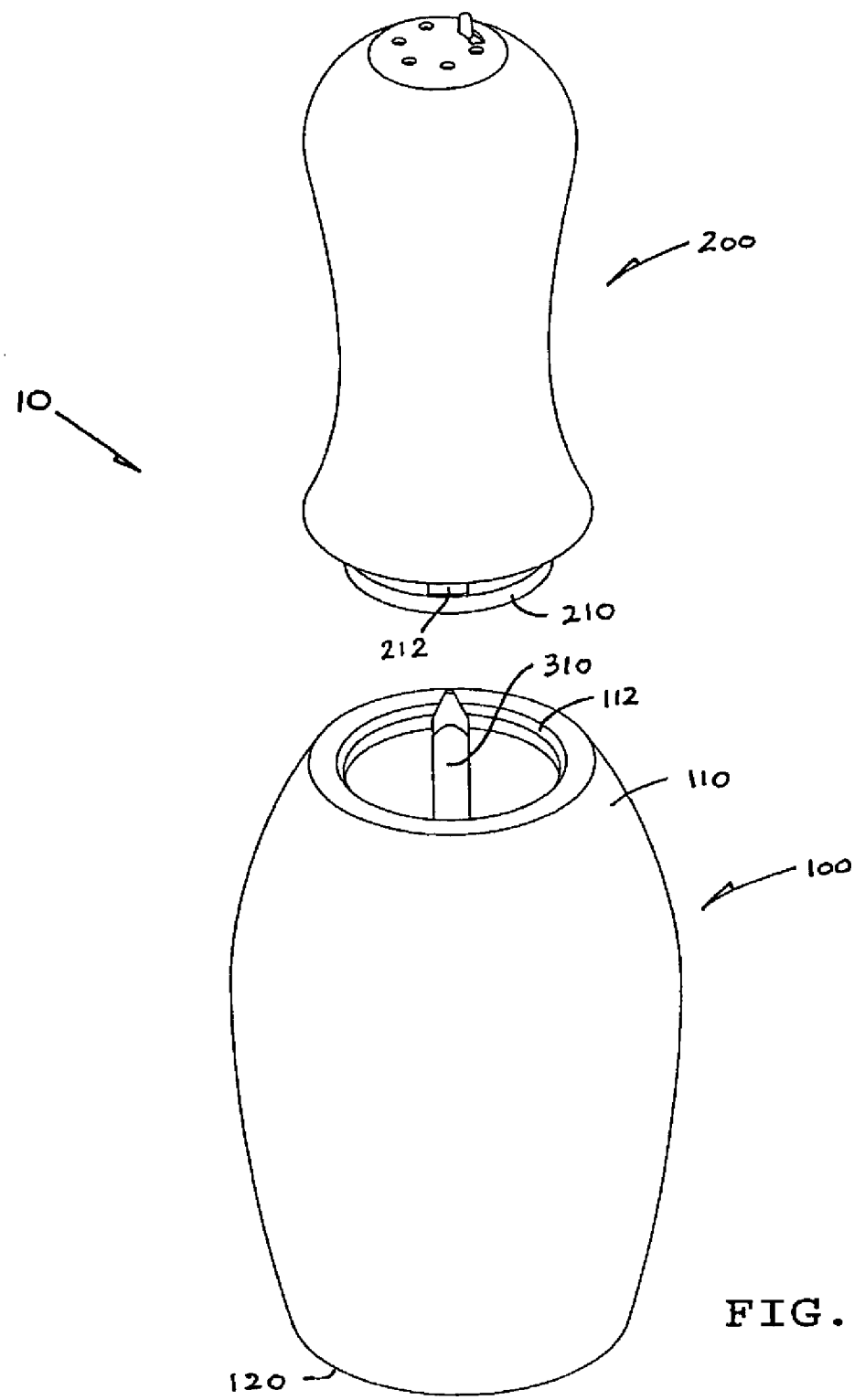
Figure 2:
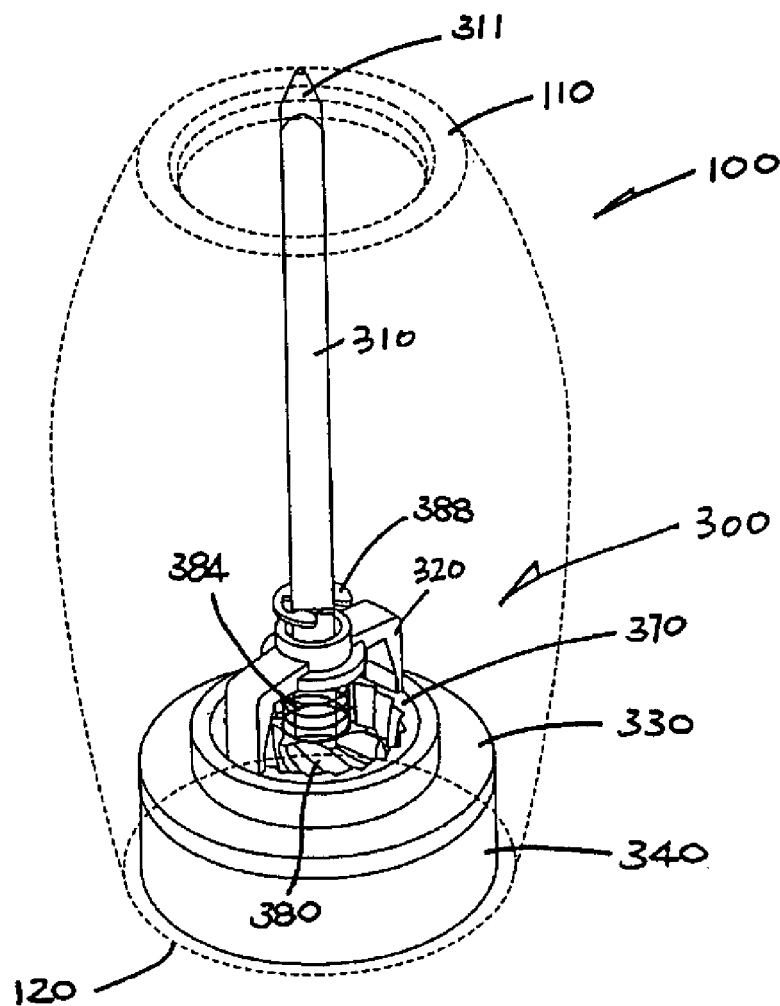
Figure 3:
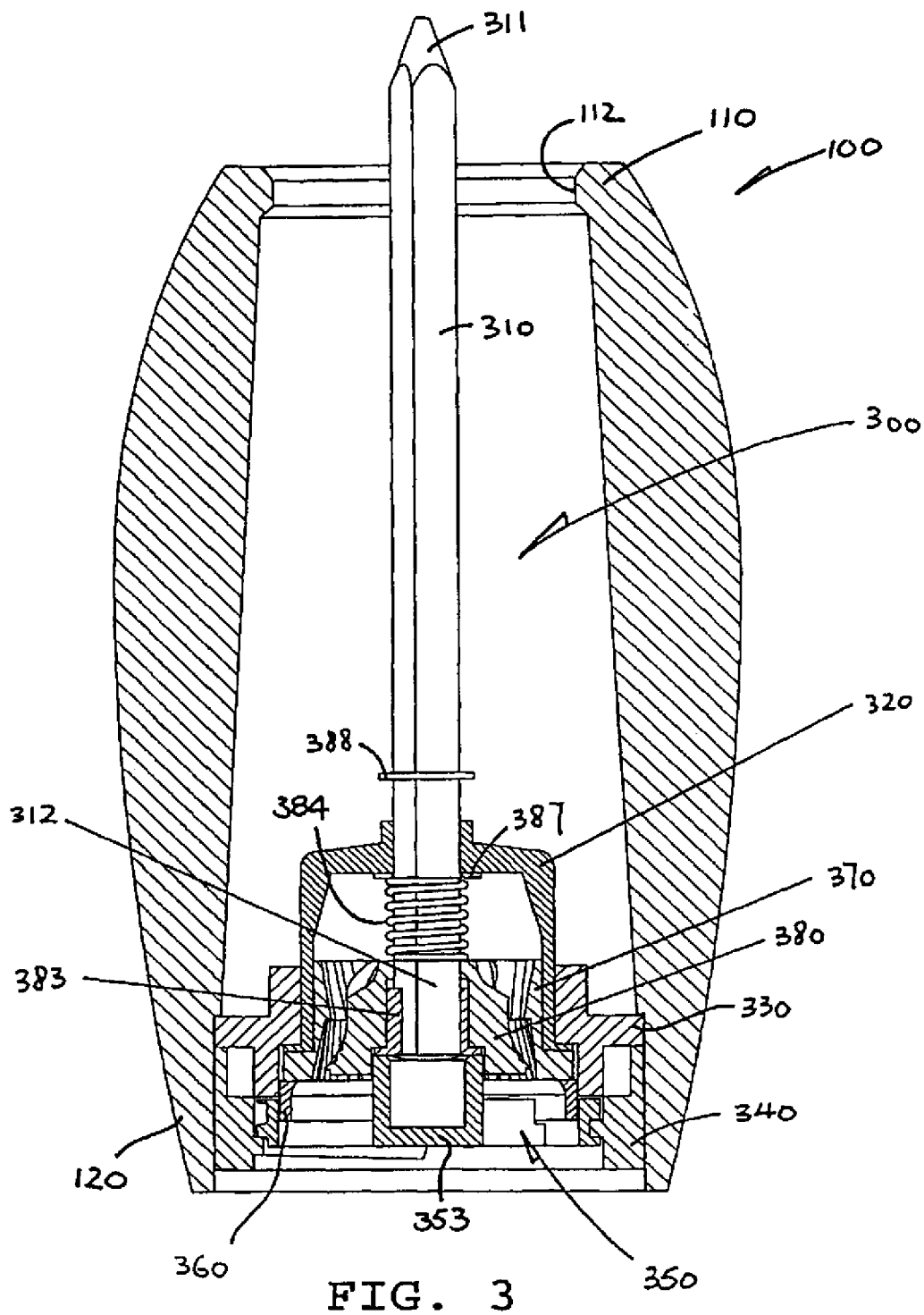
Figure 4:
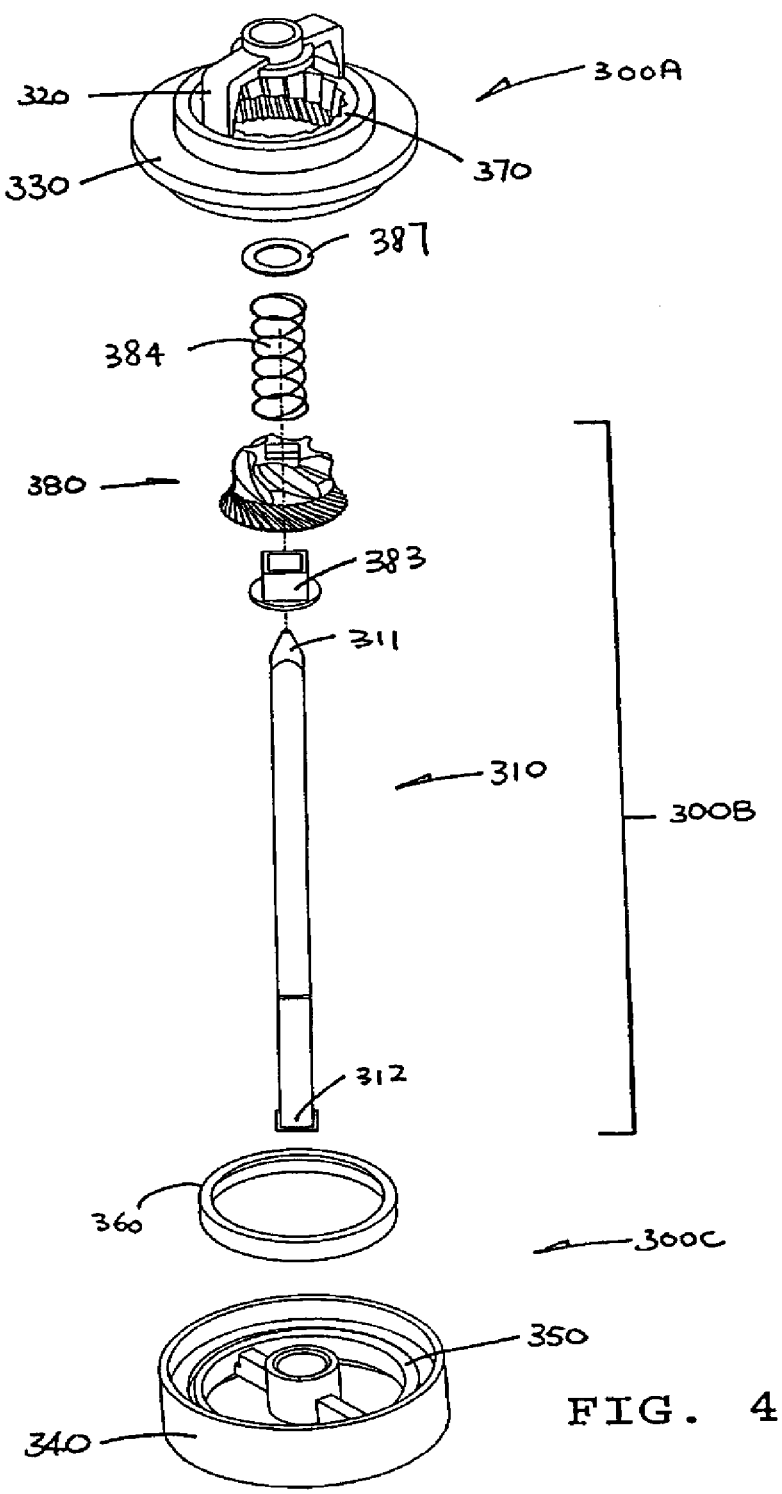

The base ring 340, positioning ring 350 and spacer ring 360 constitute a lower unit 300C (FIGS. 8 and 8A). The base ring 340 is in the from of a cylindrical collar 341 having, on and around its thickened inner peripheral surface 342, an integral rib 343. The rib 343 extends co-axially with the collar 341 in a flat helical manner over almost one complete turn, and includes four shallow recesses 344 equiangularly on its upper side. The rib 343 acts as a screw thread, including a step 345 formed between its upper and lower ends.

The positioning ring 350 has, on and around the outer peripheral surface of its ring body, an integral rib 351 that extends co-axially with the ring 350 in a flat helical manner over about one and a half turn. The rib 351 acts as a screw thread, including a thickened part 352A on its lower side at about half a turn from its upper end and another thickened part 352B on its upper side slightly downstream of the lower thickened part 352A. The ring 350 includes a hollow cylindrical central boss 353 connected thereto by an integral cross member in the form of a pair of diametrically extending spokes 355, each spoke 355 having a stepped outer end 356. The boss 353 protrudes upwardly from the plane of the ring 350, having an open top end 354 as defined by a central hole therein.

For assembly, the positioning ring 350 is co-axially engaged within the base ring 340 through respective screw threads 351 and 343, such that the inner ring 350 can be turned in either direction relative to the outer ring 340. For turning, a user should insert his/her thumb and index finger into respective halves of the positioning ring 350 from below to grasp the two spokes 355 and then turn clockwise to screw the positioning ring 350 upwards into the base ring 340 or anti-clockwise to unscrew it downwards.

The upper thickened part 352B of the inner screw thread 351 serves to abut with the step 345 of the outer screw thread 343, thereby preventing over-unscrewing and hence separation of the positioning ring 350 from the base ring 340.

The lower thickened part 352A of the inner screw thread 351 acts as a snap protrusion releasably engageable with any one of the four recesses 344 of the outer screw thread 343, thereby defining four equiangular positions of the positioning ring 350 relative to the base ring 340.

The spacer ring 360 is a simple flat cylindrical collar, having a slightly smaller diameter than the positioning ring 350. It is located co-axially and partially in the positioning ring 350, embracing the spokes 355 by their outer end steps 356. The spacer ring 360 serves to prevent over-screwing of the positioning ring 350 into the base ring 340 and hence dislodgment thereof internally.

For assembly, the upper unit 300A, including the middle unit 300B, is lowered onto the lower unit 300C, such that the lower collar part 333 of the top ring 330 is inserted co-axially into the collar 341 of the base ring 340. In doing so, the central boss 353 of the positioning ring 350 abuts from below, via the bush 383, the male grinding member 380 through the enlarged lower end of its central hole 382. The male grinding member 380 is thus pushed upwardly slightly further into the female grinding member 370, against the action of the spring 384.

The flange 336 of the top ring 330 is then secured with the upper rim of the base ring body 341 by glue for example, whereby the upper and lower units 300A and 300C including the middle unit 300B are assembled together. The resulting assembly 300A–C, or the grinding mechanism 300, is subsequently inserted from below fully into the bottom end 120 of the grinder bottle 100 and is finally secured therein by glue for example.

The positioning ring 350 is supported by the base ring 340 for relative upward and downward movement through screwing engagement between their ribs 351 and 343. In turn, the positioning ring 350 upwardly supports, by its protruding central boss 353, the male grinding member 380 in a spaced-apart relationship within the female grinding member 370, against the action of the spring 384. Thus, adjustment of the vertical position of the positioning ring 350 will result in adjustment of the frusto-conical gap width between the lower teeth 386 and 376 of the two grinding members 380 and 370, thereby adjusting the granular size of the pepper ground by the teeth 386 and 376.

As described above, in order to turn the positioning ring 350, a user only needs to insert his/her thumb and index finger from below into respective halves of the ring 350 and then grasp the two spokes 355 like a winged knob. The positioning ring 350 may be turned clockwise to move slightly upwards into the base ring 340 for reducing the pepper grinding size (FIGS. 9 and 9A), or anti-clockwise to move slightly downwards for increasing the grinding size (FIGS. 10 and 10A).

Access to the spokes 355 is convenient, as they are fully exposed within the entire opening of the base ring 340 on the bottom side of the grinding mechanism 300. The protruding central boss 353 defines a space beyond the spokes 355, thereby creating a deeper room through the positioning ring 350 for insertion of the thumb and index finger to facilitate grasping of the spokes 355. Given that both spokes 355 extend radially outwards to reach the circumferential body of the positioning ring 350, extending across opposite sides thereof, the force required to turn the ring 350 can be minimized.

Advantageously, the bottom surface of the perimeter of the base ring 340 is marked with indicia to indicate the four predetermined angular positions of the positioning ring 350 and in turn the pepper grinding size (FIGS. 9 and 10). The indicia comprise an arrow 357 on one of the spokes 355 pointing outwards and dots 347 on the base ring 340 at corresponding equiangular positions, in that one dot 347 indicates the finest grinding size and four dots 347 indicate the coarsest grinding size, etc.

Given the four predetermined equiangular positions, the positioning ring 350 only needs to turn through a maximum angle of about 270°. In any event, the turning should preferably be limited to within one complete turn, i.e. smaller than 360°, so that there will be a single grinding size associated with every possible position of the adjustment ring 350.

Both spokes 355 are straight and together form a linear cross member for grasping or gripping. It is envisaged that they may be made slightly curved and/or protruding outwards to facilitate grasping.

The invention has been given by way of example only, and various other modifications and/or variations to the described embodiment may be made by persons skilled in the art without departing from the scope of the invention as specified in the accompanying claims.

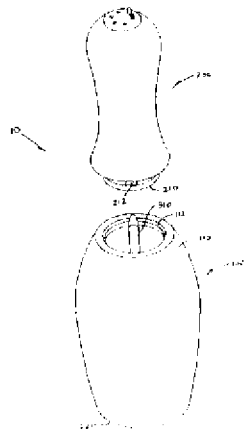

I claim:
1. A pepper grinder comprising:
a bottle for containing pepper seeds, the bottle having first and second openings, through which first opening the bottle may be refilled with pepper seeds; and
a pepper grinding mechanism provided in the second opening of the bottle, through which pepper ground by the grinding mechanism may be dispensed;
wherein the grinding mechanism comprises:
a female grinding member;
a male grinding member supported co-axially in the female grinding member for rotation relative thereto for grinding pepper, the two members being spaced apart by an annular gap in which pepper is to be ground; and
a positioning ring in engagement with the male grinding member and supported for turning to adjust the axial position of the male grinding member relative to the female grinding member and hence the width of the gap and in turn the pepper grinding size; the positioning ring comprising a ring body and a cross member that extends across the circumference of the ring body for engagement by a user to turn the positioning ring,
wherein the grinding mechanism includes a base ring supporting the positioning ring co-axially for turning through screw-thread engagement.

2. The pepper grinder as claimed in claim 1, wherein the cross member extends substantially radially across opposite sides of the ring body.

3. The pepper grinder as claimed in claim 2, wherein the cross member extends substantially diametrically across opposite sides of the ring body.

4. The pepper grinder as claimed in claim 1, wherein the cross member comprises a plurality of equiangularly spaced spokes.

5. The pepper grinder as claimed in claim 4, wherein the cross member comprises two diametrically extending spokes.

6. The pepper grinder as claimed in claim 1, wherein the grinding mechanism includes a spring resiliently biassing the male grinding member against the positioning ring.

7. The pepper grinder as claimed in claim 6, wherein the grinding mechanism includes a central operating shaft having an end extending through and in engagement with the male grinding member for rotating it, and the spring is disposed on the shaft end.

8. The pepper grinder as claimed in claim 1, wherein the positioning ring is arranged to be turned through an angle smaller than 360°.

9. The pepper grinder as claimed in claim 1, wherein the positioning ring includes a protruding central boss in co-axial engagement with the male grinding member, the boss being connected by the cross member to the ring body.

10. The pepper grinder as claimed in claim 9, wherein the grinding mechanism includes a central operating shaft having an end extending through and in engagement with the male grinding member for rotating it, and the boss includes a central hole accommodating the shaft end.

11. The pepper grinder as claimed in claim 1, wherein the positioning ring and the base ring have co-operable screw threads for engagement and include inter-engageable parts to define a plurality of predetermined angular positions for the positioning ring relative to the base ring.

12. The pepper grinder as claimed in claim 11, wherein the base ring includes indicia to indicate the predetermined positions of the positioning ring.

13. The pepper grinder as claimed in claim 11, wherein the positioning ring has four equiangular predetermined positions relative to the base ring.

14. A pepper grinder comprising:
a bottle for containing pepper seeds, the bottle having first and second openings, through which first opening the bottle may be refilled with pepper seeds; and
a pepper grinding mechanism provided in the second opening of the bottle, through which pepper ground by the grinding mechanism may be dispensed;
wherein the grinding mechanism comprises:
a female grinding member;
a male grinding member supported co-axially in the female grinding member for rotation relative thereto for grinding pepper, the two members being spaced apart by an annular gap in which pepper is to be ground; and
a positioning ring in engagement with the male grinding member and supported for turning to adjust the axial position of the male grinding member relative to the female grinding member and hence the width of the gap and in turn the pepper grinding size;
the positioning ring comprising a ring body and a cross member that extends across the circumference of the ring body for engagement by a user to turn the positioning ring,
wherein the grinding mechanism includes a base ring supporting the positioning ring co-axially for turning through screw-thread engagement, and the positioning ring and the base ring have co-operable screw threads for engagement and include inter-engageable parts to define a plurality of predetermined angular positions for the positioning ring relative to the base ring, and
wherein the inter-engageable parts are provided at the screw threads of the positioning ring and the base ring respectively.

15. The pepper grinder as claimed in claim 14, wherein the inter-engageable parts comprise a protrusion and recesses corresponding to the predetermined positions.

* * * * *

UNITED STATES PATENT AND TRADEMARK OFFICE
CERTIFICATE OF CORRECTION

| | | |
|---|---|---|
| PATENT NO. | : 7,048,216 B2 | |
| APPLICATION NO. | : 10/391590 | |
| DATED | : May 23, 2006 | |
| INVENTOR(S) | : Hong Wo Ng | |

It is certified that error appears in the above-identified patent and that said Letters Patent is hereby corrected as shown below:

The Title Page, showing an illustrative figure, should be deleted and substitute therefor the attached title page.

Replace Figures 1-4 printed in the above-identified patent with Figures 1-4. (attached)

Signed and Sealed this

Fourteenth Day of April, 2009

JOHN DOLL
*Acting Director of the United States Patent and Trademark Office*

(12) United States Patent
Ng

(10) Patent No.: US 7,048,216 B2
(45) Date of Patent: May 23, 2006

(54) PEPPER GRINDER

(75) Inventor: Hong Wo Ng, Tsuen Wan (HK)

(73) Assignee: Wing Po Plastic Manufactory Limited, Tsuen Wan (HK)

(*) Notice: Subject to any disclaimer, the term of this patent is extended or adjusted under 35 U.S.C. 154(b) by 95 days.

(21) Appl. No.: 10/391,590

(22) Filed: Mar. 20, 2003

(65) Prior Publication Data

US 2004/0124294 A1 Jul. 1, 2004

(30) Foreign Application Priority Data

Dec. 27, 2002 (GB) .............................. 0230230.5

(51) Int. Cl.
*A47J 42/08* (2006.01)
*A47J 42/04* (2006.01)

(52) U.S. Cl. ............... 241/169.1; 241/168; 241/169

(58) Field of Classification Search ............... 241/168, 241/169, 169.1

See application file for complete search history.

(56) References Cited

U.S. PATENT DOCUMENTS

| | | |
|---|---|---|
| 595,481 A | 12/1897 | Jenatschke et al. |
| 1,264,134 A | 4/1918 | Quick |
| 2,974,887 A | 3/1961 | Grandinetti |
| 3,371,874 A * | 3/1968 | Reeves et al. ............ 241/169.1 |
| 3,827,641 A | 8/1974 | Andersson |
| 4,530,470 A | 7/1985 | Beilstein |
| 4,685,627 A | 8/1987 | Lee |
| 5,145,119 A | 9/1992 | Lowe |
| 5,176,329 A | 1/1993 | De Coster et al. |
| 5,531,389 A | 7/1996 | Husted |
| 5,785,264 A | 7/1998 | Yang |
| 5,897,067 A * | 4/1999 | Tardif et al. ............ 241/169.1 |
| 6,443,377 B1 * | 9/2002 | Cheng .................... 241/169.1 |
| 6,793,168 B1 * | 9/2004 | Pedersen ................ 241/169.1 |
| 2004/0069881 A1 * | 4/2004 | Arduini .................. 241/169.1 |

FOREIGN PATENT DOCUMENTS

| | | |
|---|---|---|
| GB | 794560 | 5/1958 |
| GB | 1 467 588 | 3/1977 |
| GB | 2 263 074 | 7/1993 |
| GB | 2 364 937 | 2/2002 |
| GB | 2 379 622 | 3/2003 |

OTHER PUBLICATIONS

U.S. Appl. No. 10/391,591, filed Mar. 20, 2003, Ng.

* cited by examiner

*Primary Examiner*—Derris H. Banks
*Assistant Examiner*—Jason Y. Pahng
(74) *Attorney, Agent, or Firm*—Leydig, Voit & Mayer, Ltd.

(57) ABSTRACT

A pepper grinder comprising a pepper seed bottle having upper and lower openings, through which upper opening the bottle may be refilled. A pepper grinding mechanism is provided in the lower bottle opening, through which ground pepper may be dispensed. The mechanism comprises a female grinding member and a male grinding member supported co-axially therein for relative rotation to grind pepper, the two members being spaced apart by an annual gap in which pepper is to be ground. The mechanism includes a positioning ring in engagement with the male grinding member, which may be turned to adjust the axial position of the male grinding member relative to the female grinding member and hence the width of the gap and in turn the pepper grinding size. The positioning ring comprises a ring body and two spokes that extend across opposite sides of the ring body for engagement by a user to turn the ring.

15 Claims, 9 Drawing Sheets